Nov. 26, 1963  J. D. DESCHAMPS ETAL  3,112,483
WIDE ANGLE SCANNING REFLECTOR
Filed July 15, 1958  6 Sheets-Sheet 1

INVENTORS
JACQUES D. DESCHAMPS
JACQUES M. COMBELLES
By
THEIR AGENT

3,112,483
WIDE ANGLE SCANNING REFLECTOR
Jacques D. Deschamps, Saint-Cloud, and Jacques M. Combelles, Versailles, France, assignors to Societe Nouvelle d'Electronique (S.A.R.L.), Paris, France
Filed July 15, 1958, Ser. No. 749,578
Claims priority, application France July 26, 1957
3 Claims. (Cl. 343—100)

The present invention relates to reflecting systems and more particularly to a wide angle scanning toroidal reflector; it relates also to a method of reducing the focussing aberrations of a microwave beam, resulting from the motion of a primary source of energy in front of the reflecting surface, during a wide amplitude scanning of space along two directions perpendicular to each other.

To understand the problem, it is necessary to recall how the focussing aberrations are calculated in a focussing system. For a given position of the source and a given radiation direction, these aberrations are determined by computing the distance between the source, any point of the focussing surface and the perpendicular projection of this point on a reference plane which is normal to the radiation direction.

When the system is in perfect focus, all these distances are equal. The difference in the distances, as calculated for different points of the useful surface of the reflector, corresponds to the focussing aberrations. It is usual to have these aberrations expressed as a limited series; for example, the following series limited to the fourth order term may be used:

$$\frac{l_1 - l_2}{\lambda} = a_0 + a_1 x + a_2 x^2 + a_3 x^3 + a_4 x^4 + \cdots$$

where:

$a_0$ is a constant factor depending on the choice of the reference plane;
$a_1 x$ can be eliminated according to the suitable choice of the radiation direction;
$a_2 x^2$ corresponds to the aberration of the second order;
$a_3 x^3$ corresponds to the coma aberration;
$a_4 x^4$ corresponds to the fourth order aberration;
$l_1$ and $l_2$ are the distances defined above, $l_1$ being $FM_1 m_1$, and $l_2$ being $FM_2 m_2$ in FIG. 1;
$\lambda$ is the wavelength.

The problem of wide angle scanning in a plane has been studied and solutions have been considered. It has been proposed in particular to use toroidal reflecting surfaces, the energy source moving in a plane perpendicular to the axis of revolution of the torus and the microwave beam being moved in that plane. By way of symmetry, the odd order aberrations are identically zero for such a structure. The magnitude of the source motion in a plane perpendicular to the axis is limited only by purely mechanical conditions, chiefly by cast shadow. When the beamwidth is considered, it is natural to use a torus with a focussing directrix and in particular it has been proposed to use a parabolic torus (K. S. Kelleher, Convention Record of the I.R.E., 1953, part II, pages 56 to 58). It is easy to show that the use of a parabolic torus leads to aberrations, in particular of the second order which, although they are independent from the source position on the focal line, cannot be reduced to naught simultaneously for all the points of the useful portion of the reflecting surface. Very troublesome limitations are encountered with this type of reflector chiefly if very narrow beams are desired, said limitations being traceable to the fact that an absolutely plane wave cannot be obtained. A first limitaion concerns the beamwidth in the scanning plane; for beams narrower than three degrees, the relationship between the beamwidth and the aperture size is no longer linear. There is a decrease of the efficiency of the aperture as the beamwidth decreases. For this reason, it is considered impractical to obtain a narrow beamwidth of the order of one degree in the scanning plane. An improvement in this limitation seems to have been obtained with an elliptical torus ("A Toroidal Microwave Reflector," by George Peeler and Donald Archer in I.R.E. Convention Record, 1956, part I, pages 242 to 248). With this reflector, beam widths of 1.5 degrees have been obtained with a good surface efficiency.

Toroidal reflectors present yet another drawback when it is desired to obtain three-dimensional rather than merely two-dimensional scanning. In fact, the aberrations increase very rapidly as the primary energy source moves no longer on the focal line.

In order to maintain acceptable standards, it is necessary to limit the source motions to a direction parallel to the axis of revolution, which limits scanning in the corresponding direction to 4 or 5 beamwidths.

A space scanning system keeping aberrations at a minimum value has been proposed in U.S. Patents 2,663,016 and 2,639,384 which relate to antennas having a focal line or surface and which include components of a grating formed by secondary radiators excited by a single primary radiator, the primary radiator moving over a small distance for producing a scanning beam and providing a family of virtual focusing surfaces having equi-phase wavefronts. (See Patent 2,639,384, column 3, lines 72 et seq.). These systems reduce to a minimum the third order aberrations, although there still exists a limitation to the magnitude of the primary source motion, because the sum of the aberrations is not constant and the use even of the stationary characteristic lines implies theoretically infinitesimal motions.

From a practical point of view, the second system involves the construction of a reflector from elements which belong to different surfaces and which are disposed in a manner well known in optics and radioelectricity, where use is made of gratings. This consists in the use of elements, selected on different surfaces, correctly defined so that the partial reflections of the radiated energy from each element present comparable magnitudes and phase angles in arithmetical progression and these partial reflections are summed up in the desired directions. This system is well known per se.

None of the mentioned systems solves the problem to which the present invention offers a solution. Antennas of toroidal structure satisfactorily meet the problem of scanning in a plane provided that the desired beamwidth is not too narrow. In fact, the second order aberration has a relatively high value, which requires the beam not to be too narrow. Furthermore, the construction is such that the third order aberration is canceled only if the source is located on the focal line. As soon as the source moves from the plane containing the focal line, the third order aberration increases very quickly. Therefore, this system can be used only in planar scanning, and even under such conditions, the second order aberration remains slightly troublesome. The second above mentioned system allows spatial scanning but with limited amplitude.

The main object of the invention is to improve the performances of toroidal type reflectors by reduction of the second order aberration.

Another object of the invention is the provision of a toroidal antenna for wide amplitude scanning in space, for example, of the order of 15 beamwidths in a plane containing the axis of revolution of the structure, without being limited to a plane perpendicular to this axis.

Another object of the invention is a correcting process of focussing surfaces, said surfaces being used for very narrow microwave beams (aperture size of 1 degree) to which it is desired that a wide amplitude scan motion be given in the space.

Another object of the invention is the provision of high efficiency reflectors for wide amplitude scanning in space, these reflectors being produced by simple machining operation.

According to an essential feature of the invention, an assembly of elements selected on toroidal surfaces having homofocal parabolic generatrices constitute the grating reflector, said elements being selected so as to reduce to a minimum or even to naught, the aberrations which have been mentioned above.

The invention will be well understood by reference to the following description and to the accompanying drawing illustrating an example of the invention without limiting the same thereto. In the drawing.

In order to facilitate the understanding of the present invention, it is necessary to give a brief survey of the properties of the parabolic torus.

Figure 1:
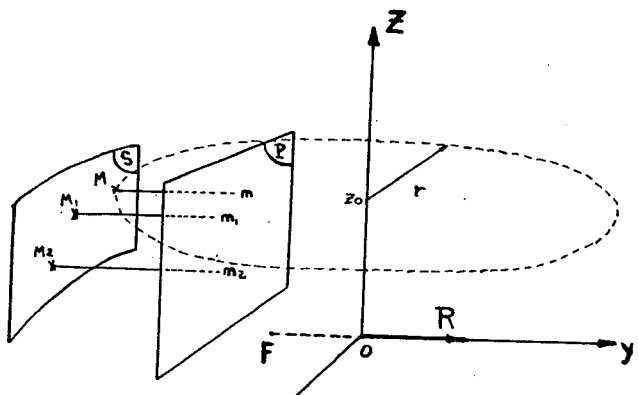
FIGURE 1 represents a portion of a reflecting surface constituted by a parabolical torus.

The FIGURE 1 shows a portion S of the reflecting surface constituted by a parabolic torus having OZ as axis. It is assumed that OR represents the radiating direction, M is a point of the surface S and P is the reference plane, perpendicular to the OR direction and having the point F in it. It is further assumed, by hypothesis, that the primary energy source is located at the intersection of the focal line and OY axis; in this direction OR is necessarily merged with OY. The study of the focussing aberrations of the surface S leads to the calculation of the distance $FMm$, where $m$ is the perpendicular projection of point M on the plane P, for all the points of the surface.

The aberrations are defined by the differences existing between the distances $FM_1m_1$ and $FM_2m_2$ relating to the points $M_1$ and $M_2$ of the surface S, this difference being divided by the wave length $\lambda$.

As has been stated above, the aberrations are usually studied by means of a series, limited for instance to the third order terms, of the difference of the cited distances:

$$\frac{FM_1m_1 - FM_2m_2}{\lambda} = a_0 + a_2 x^2 + \cdots$$

In the above expression, the odd terms are zero by way of symmetry.

According to the invention, the reflecting surface S has surface elements provided on parabolic tori with homofocal directrices, which constitute a grating; in that case, in the direction of radiation, the partial reflections from the surface elements are out of phase by multiples of 2 pi, i.e. the energy radiated from the elementary surfaces are summed up in that direction. A point M at $Z_0$ elevation on this reflecting surface is on a circle, the radius of which is $r$ and the axis OZ. The value of $r$ defines the order of the torus on which the reflecting surface element at the elevation $Z_0$ has been cut.

According to the invention, this torus is selected so that the second order the third order aberrations are reduced to a minimum, the third aberration corresponding to motions of the source parallel to OZ, with the primary source being normally located at F. It will be shown that it is always possible to define, for a given reflecting surface element, the order of the torus necessary to produce the second order aberration to naught when the source of energy is located at the focus F. For this end, it is necessary to establish the value of the coefficient $a_2$ in the series as above defined. By hypothesis, the coordinates of points F and M are as follows:

$$M \begin{vmatrix} x \\ y \\ z_0 \end{vmatrix} \quad F \begin{vmatrix} 0 \\ -f \\ 0 \end{vmatrix}$$

The direction of radiation $\overrightarrow{OR}$ is defined by its cosine vectors.

$$\overrightarrow{OR} \begin{vmatrix} 0 \\ 1 \\ 0 \end{vmatrix}$$

Further, the point M is, by hypothesis, located on a circle the equations of which are:

$$\begin{cases} x^2 + y^2 - r^2 = 0 \\ Z = Z_0 \end{cases}$$

By a second-order approximation of the MacLaurin expansion of these relationships solved for $y$ and by considering only the points with negative ordinates, one infers from the equations:

$$y \cong r\left(1 - \frac{x^2}{2r^2}\right)$$

The distance $FMm$ is computed as follows:

(1) $\qquad FMm = |\overrightarrow{FM}| + |\overrightarrow{FM} \cdot \overrightarrow{OR}|$ or $$|FM| \cong \left[(r-f)^2 + Z_0^2 + f\frac{x^2}{r}\right]^{1/2}$$

by a second-order approximation of the MacLaurin expansion of this function one obtains:

(2) $\qquad |FM| \cong [(r-f)^2 + Z_0^2]^{1/2}\left[1 + \frac{fx^2}{2r[(r-f)^2 + Z_0^2]}\right]$ On the other hand:

(3)

$$|\overrightarrow{FM} \cdot \overrightarrow{OR}| = \left| -r\left(1 - \frac{x^2}{2r^2}\right) + f \right| = r\left(1 - \frac{x^2}{2r^2}\right) - f$$

by limitation to the case of FIG. 1 where $\overrightarrow{FM} \cdot \overrightarrow{OR}$ is negative.

By identifying the distance $FMm$ computed as shown above with that given by the series, one has:

(4) $\qquad a_2 = -\frac{1}{2r}\left(1 - \frac{f}{[(r-f)^2 + z_0^2]^{1/2}}\right)$ To make $a_2 = 0$, it is necessary to have:

(5) $\qquad (r-f)^2 + Z_0^2 - f^2 = 0$ which gives the relation between the value of $Z_0$, elevation of the considered point M and the radius $r$ of the section of the torus upon which the point M should be.

In order to find in the YOZ plane, the locus of the points which satisfy the condition $a_2 = 0$, $Z_0$ will be replaced by $z$ and $r$ by $-y$, which gives:

(6) $\qquad (y+f)^2 + z^2 - f^2 = 0$

This Equation 6 represents a circle with the center F and radius $f$ (see FIGURE 2), this circle being tangent to the OZ axis. The circle as defined by Equation 6 corresponds to the locus of the points of the reflecting surface for which the second order aberration is zero in a given plane. By way of symmetry, the locus in space is obtained by the rotation of the circle around the OZ axis.

According to the invention, the elementary surfaces are provided on the homofocal parabolic torus gratings so that the coma aberration is reduced when the source of energy moves parallel to the OZ axis.

If the study of the coma aberration is limited to that in the plane defined by OZ and the source, for motions of the source in that plane, an already known result may be used (see for instance "Scanning Aberrations of Radio Lenses," pages 174 to 184 of Cheston and Shinn in Transactions of I.R.E., December 1952, part Antenas and Propagation). According to this study, the locus of the points corresponding to the cancelling of the coma is a circle with the center F and radius $f$. If the computation is made (for instance by using the methods of the above cited article), one sees that the cancelling condition of the coma remains satisfied, with a sufficient approximation, on the whole useful surface. This circle is the same as that defined by Equation 6, so it appears that the cancelling condition of the second order aberration together with the reduction to a minimum value of the coma may be simultaneously fulfilled under the conditions of the chosen example.

According to the invention the reflecting surface is made of areas provided on homofocal parabolic tori which constitute a grating in the vicinity of their intersection with the surface obtained by revolving the circle as defined by Equation 6, around OZ.

In the preceding passages, the reflection in the direction OY has been discussed. It has been supposed that the parabolic directrices of the torus grating have their axis perpendicular to OZ. It is of course possible to use parabolas the axis of which is only approximately perpendicular to OZ for instance, said axis making an angle of 85 degrees with OZ. Under these conditions, it can be shown that the locus of the points corresponding to a second order aberration reduced to naught is a circle with the center F which is no longer tangent to OZ. This circle remains very near the zero coma curve, which allows to practically determine the areas to be cut out on each torus of the grating to reduce the second order aberration together with the coma simultaneously to a minimum for all the points of the useful surface of the reflector.

Figures 2, 3:
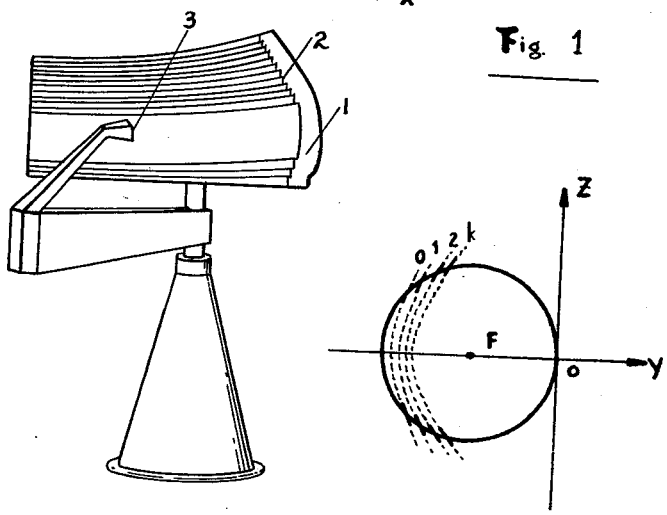
FIGURE 2 represents the locus of the points for which the second order aberration is reduced to naught.
FIGURE 3 is a view of the reflecting surface according to the invention.

FIG. 3 presents a reflector built according to these principles. Reflector 1 fed by a source of energy 3 has been designed to operate in the microwave range. The reflector 1 may be obtained, for example, by machining a solid work piece on a lathe; the reference number 2 shows the curve which can be seen on the edge of the reflector and which constitutes the end of the different reflecting areas selected in the vicinity of the intersection of the toroidal surfaces with homofocal parabolic generatrices with the circle as defined by the Equation 6 and revolving around the axis OZ. This reflector 1 is fed by a horn 3 located approximately at the common focus of the parabolas. This horn representing the source of energy of the so defined microwave antenna can be movable as well as the reflector.

Figure 4:
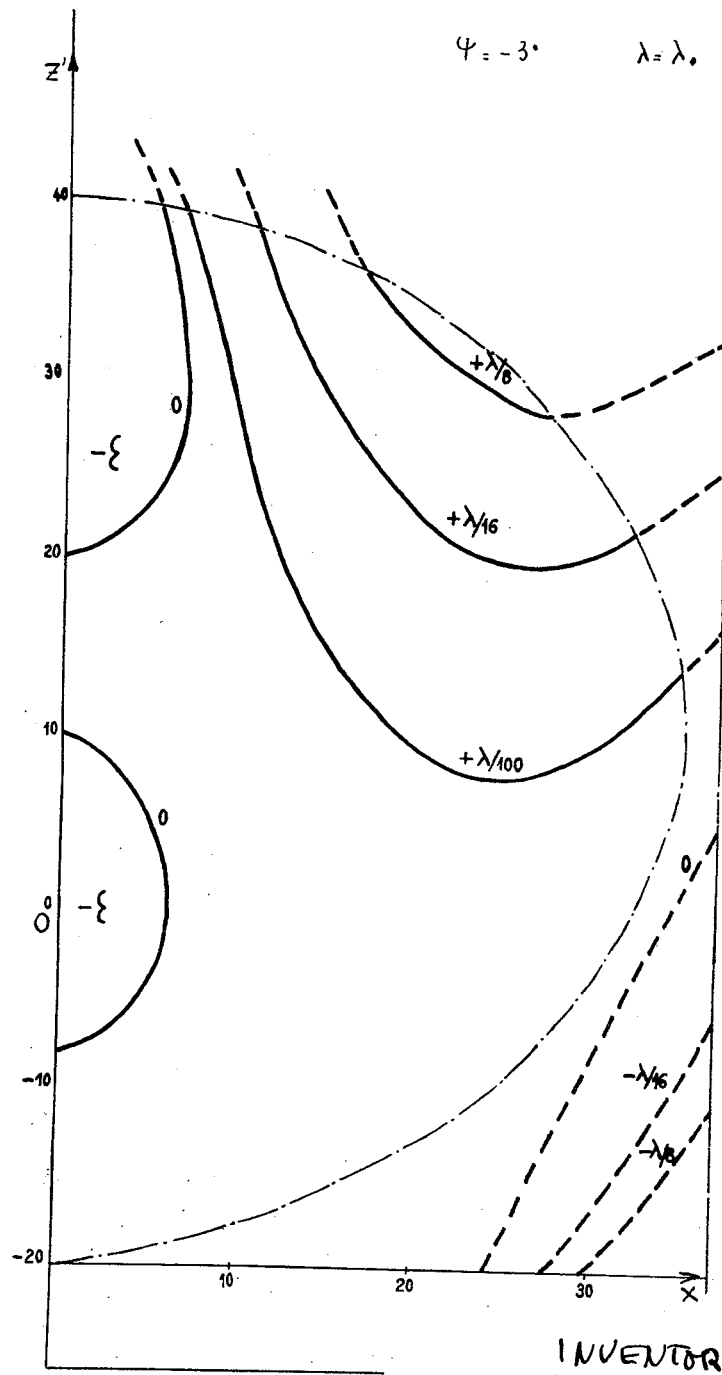
FIGURE 4 to FIGURE 8 show the outphasing curves obtained with this reflecting surface and radiation patterns.
Figure 5:
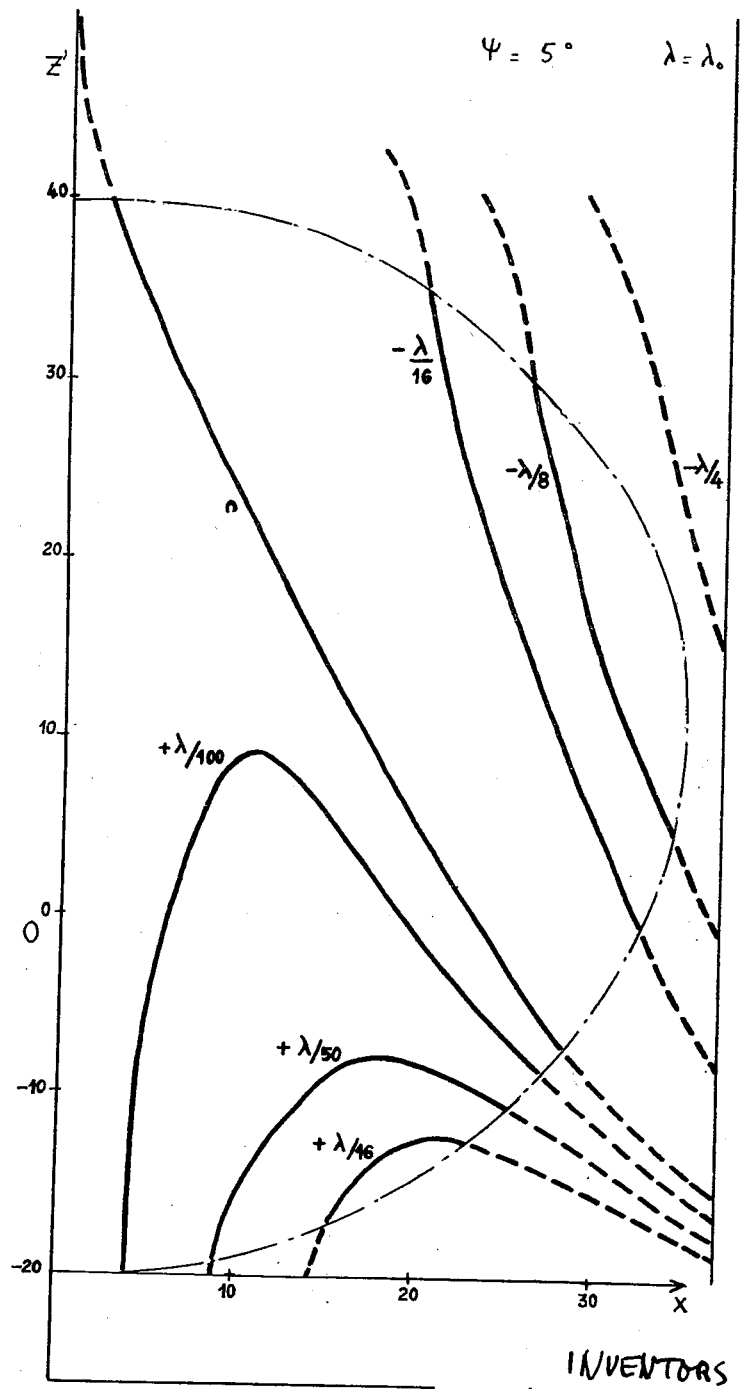
Figure 6:
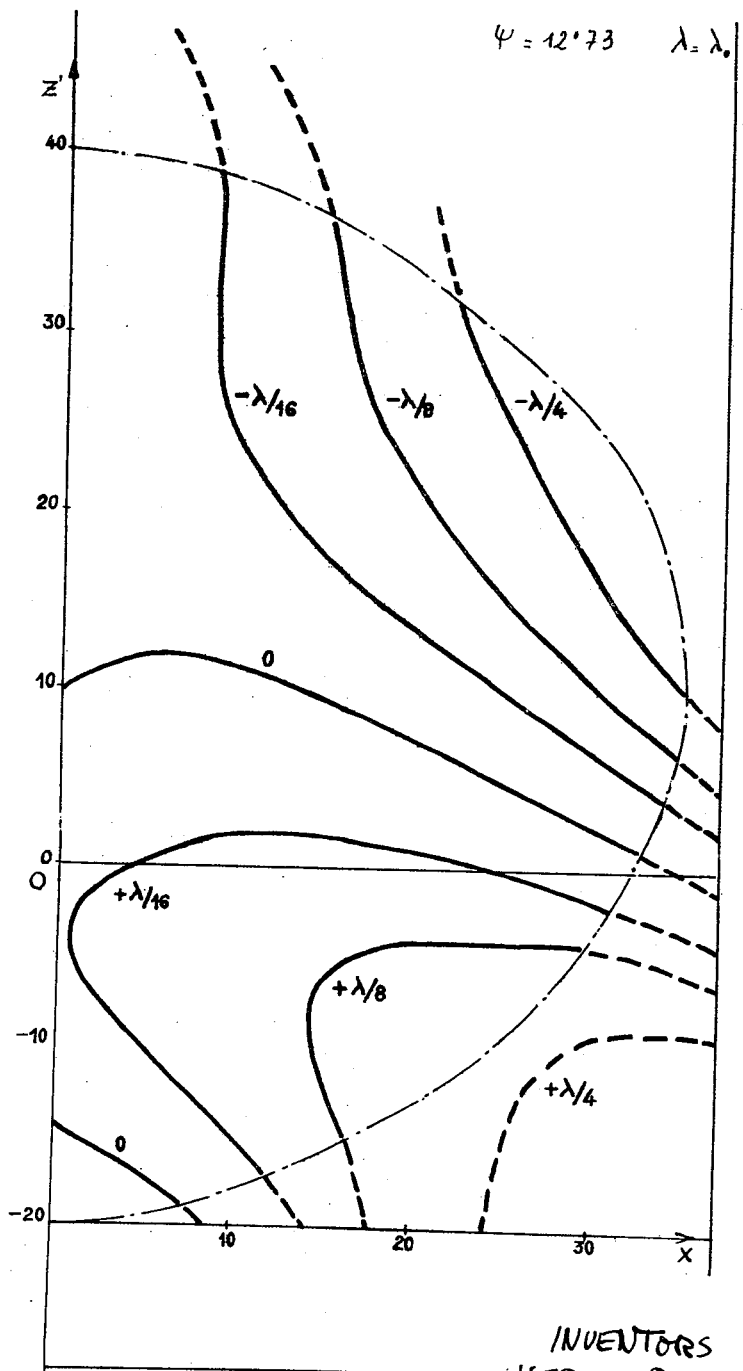

The FIGURES 4, 5, 6 give the outphasing curves obtained with this reflector for different values of the elevation angle $\psi$, this reflector being designed to secure a 45 degree angle scanning in the horizontal plane, this plane being approximately normal to the axis of revolution of the tori, with a beamwidth of 0.9 degree ±0.1 degree for 3 db in the horizontal and vertical planes and a scanning from −4 to 12 degrees in the vertical plane. Curves of equal phase angles have been represented in the aperture plane, this plane being normal to the direction OR of the radiation, the axis OZ' being the projection of OZ axis. The curve in dotted line approximately shows the limit of the useful portion of the reflector.

Figure 7A:
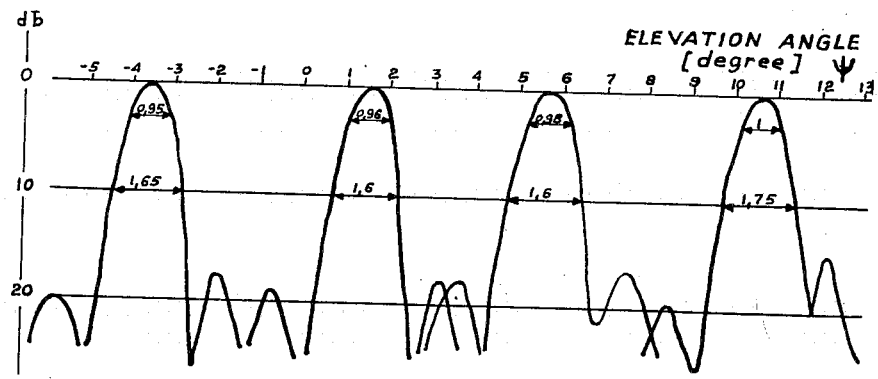
Figure 7B:
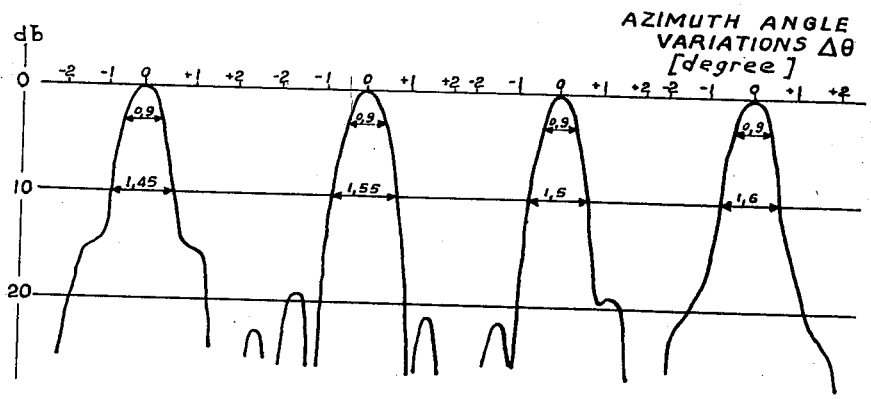
Figure 8:
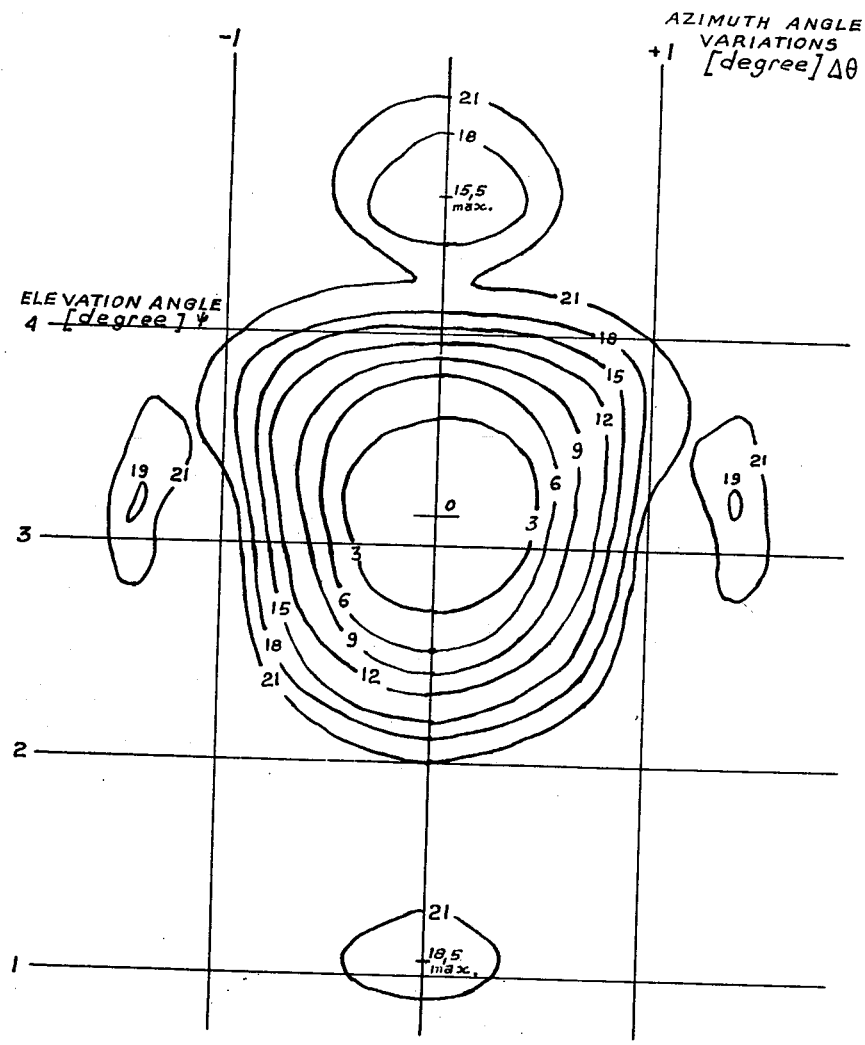

The FIGURES 7 and 8 represent radiation patterns obtained with microwave antenna using the reflector according to the invention. FIGURE 7a shows the vertical pattern in which the relative intensity of the beam is expressed in decibels in terms of various elevation angles of said beam. FIGURE 7b shows the horizontal radiation pattern in which the relative intensity of the beam is expressed in decibels in terms of variations of azimuth angle for each elevation of the FIGURE 7a. These figures show clearly that the beams are not very much distorted at the limits of the scanning in the vertical plane. The FIGURE 8 presents a radiation pattern for the mean position of the beam in which pattern 3 by 3 decibels level curves have been traced. One can see that the secondary lobes in the bisector planes, which constitute the usual drawback of the toroidal reflectors, have totally disappeared.

This example of the reflector together with the given diagrams is not at all limitative; it merely shows that the above described grating reflector constitutes an improvement over the classical toroidal reflector, being free of the two mentioned limitations, the difficulty of obtaining a narrow beam and the restriction to a two-dimensional scanning.

What we claim is:

1. In combination, a reflector having a stepped reflecting surface adapted to radiate a narrow beam of radio waves and a primary source of said waves in front thereof, said reflector comprising a plurality of adjacent stepped reflecting elements, each reflecting element having a substantially toroidal reflecting surface having a substantially parabolic generatrix, the generatrices having different focal lengths and having a common focus, said reflecting surfaces being narrow relative to their length and disposed at the intersections of said generatrices with a circle tangent to the toroidal axis of the reflector, said circle having said focus as its center and having a radius substantially equal to the maximum focal length, whereby focusing aberrations are reduced when said primary source of radio waves is displaced from said common focus.

2. In combination, a reflector having a stepped reflecting surface adapted to radiate a narrow beam of radio waves and a primary source of said waves in front thereof, said reflector comprising a plurality of adjacent stepped reflecting elements, each reflecting element having a substantially toroidal reflecting surface having a substantially parabolic generatrix, the generatrices having different focal lengths and having a common focus, said primary source being located at the focus and said reflecting surfaces being narrow relative to their length and disposed at the intersections of said generatrices with a circle tangent to the toroidal axis of the reflector, said circle having said focus as its center and having a radius substantially equal to the maximum focal length, whereby second order focusing aberrations are reduced and third order focusing aberrations are substantially eliminated when the primary source moves parallel to the toroidal axis.

3. In combination, a reflector having a stepped reflecting surface adapted to radiate a narrow beam of radio waves and a primary source of said waves in front thereof, said reflector comprising a plurality of adjacent stepped reflecting elements, each reflecting element having a substantially toroidal reflecting surface having a substantially parabolic generatrix, the generatrices having different focal lengths and having a common focus, means for mounting said primary source for movement along a line through the focus, and said reflecting surfaces being narrow relative to their length and disposed at the intersections of said generatrices with a circle tangent to the toroidal axis of the reflector, said circle having said focus as its center and having a radius substantially equal to the maximum focal length, whereby third order focusing aberrations are substantially eliminated when the primary source of waves moves parallel to the toroidal axis.

References Cited in the file of this patent
UNITED STATES PATENTS

| | | |
|---|---|---|
| 1,906,546 | Darbord | May 2, 1933 |
| 2,639,384 | Coligny | May 19, 1953 |
| 2,663,016 | Coligny | Dec. 15, 1953 |